United States Patent Office 3,297,793
Patented Jan. 10, 1967

3,297,793
CONTINUOUS PROCESS FOR PRODUCING BLOCK COPOLYMERS OF DIENES AND VINYL AROMATIC COMPOUNDS
Robert E. Dollinger, Bartlesville, Okla., assignor to Phillips Petroleum Company, a corporation of Delaware
Filed Dec. 21, 1962, Ser. No. 246,598
10 Claims. (Cl. 260—879)

This invention relates to the preparation of block copolymers of certain conjugated dienes with vinyl-substituted aromatic hydrocarbons. In one aspect, it relates to a continuous process for producing these block copolymers.

Various types of polymers can be prepared from different monomeric materials, the particular type formed being generally dependent upon the procedures followed in contacting the materials in the polymerization zone. For example, copolymers such as butadiene-styrene copolymers can be prepared by the simultaneous reaction of the copolymerizable monomers. It is also possible to prepare polymers which are commonly known as graft copolymers. Graft copolymers result from the joining of a comonomer to an already formed polymer at random points along the polymer chain. Another type of polymer can be obtained by a procedure known as block polymerization. The polymers, usually referred to as block copolymers, are formed by polymerizing a monomer onto the end of a polymer, the monomer being introduced in such a manner that substantially all of the coreacting molecules enter the polymer chain at this point. The particular method used in preparing the polymer has a great influence on the properties of the product obtained. Thus, copolymers, graft copolymers, and block copolymers differ greatly in their properties even though the weight percent of each of the monomeric materials contained in the polymer may be the same in each case.

In copending application U.S. Serial No. 721,293, filed on March 13, 1958 by R. P. Zelinski, there is disclosed and claimed a process for preparing block copolymers from mixtures of conjugated dienes and vinyl-substituted aromatic hydrocarbons. According to this process, a mixture of monomers, e.g., 1,3-butadiene and styrene, is polymerized in the presence of an organolithium compound, such as an alkyllithium. The polymerization is conducted in the presence of a hydrocarbon diluent, and polar compounds, such as ethers, are excluded from the process since their presence results in the formation of a random copolymer rather than a block copolymer. Block copolymers prepared according to the process of said Zelinski application are composed of two blocks, one of the blocks being a copolymer of a conjugated diene and a vinyl-substituted aromatic hydrocarbon and the other block being a homopolymer of a vinyl-substituted aromatic hydrocarbon. The process described in said Zelinski application is applicable to a batch-type operation in which a mixture of the conjugated diene and a vinyl-substituted aromatic hydrocarbon is charged to a reactor containing the initiator and the diluent. From a commercial standpoint, it would be very desirable to provide a continuous process for preparing a block copolymer as described in the Zelinski application.

In copending application Serial No. 186,178, filed April 9, 1962, by R. E. Dollinger et al., of which I am one of the coinventors, there is disclosed and claimed a continuous process in which certain selected conjugated dienes and vinyl-substituted aromatic hydrocarbons are polymerized with an organolithium initiator in the presence of a hydrocarbon diluent so as to obtain a block copolymer product. Broadly speaking, the process of said Dollinger et al. application comprises the steps of continuously charging a mixture of the conjugated diene and the vinyl-substituted aromatic hydrocarbon, the organolithium initiator, and the diluent to a prereaction zone wherein the polymerization is initiated, and thereafter passing the effluent from the prereaction zone into an elongated, tubular reaction zone, and recovering from the latter zone a reaction mixture containing a block copolymer of the conjugated diene and vinyl-substituted aromatic compound. In a modification of the process, an additional amount of the vinyl-substituted aromatic compound is added to the elongated, tubular reaction zone in order to increase the amount of this material contained in the homopolymer block of the block copolymer.

The process of said Dollinger et al. application provides valuable block copolymers of a conjugated diene and a vinyl-substituted aromatic compound. As disclosed therein, depending upon the particular type of organolithium initiator used, the copolymer product obtained contains a copolymer block of a conjugated diene and a vinyl-substituted aromatic hydrocarbon and either one or two terminal homopolymer blocks of said vinyl-substituted aromatic hydrocarbon. Said block copolymer products are characterized by high extrudability with very little or no die swell. Even though outstanding, it would be desirable to improve these and other valuable properties of said block copolymer products if possible, particularly if done in a continuous process.

In the art it is customary in analyzing polymers of this type to report the vinyl-aromatic compound content of the polymer, e.g., styrene, as (a) total bound styrene and (b) block styrene or polystyrene, the latter being a part of the total bound styrene.

It has been discovered that the properties of the copolymer products of said Dollinger et al. application can be improved and made even more outstanding by increasing the block vinyl-aromatic compound (e.g., block styrene) content.

Thus, an object of the present invention is to provide a continuous process in which certain selected conjugated dienes and vinyl-substituted aromatic hydrocarbons are polymerized with an organolithium initiator in the presence of a hydrocarbon diluent to obtain block copolymer products having an increased block vinyl-substituted aromatic content. The present invention is thus an improvement over the invention of said Dollinger et al. application.

Another object of this invention is to provide a reactor system which is suitable for preparing said block copolymer products having an increased vinyl-substituted aromatic content.

Other aspects, objects, and advantages of the invention will be apparent to those skilled in the art in view of this disclosure.

Broadly speaking, the process of the present invention comprises the steps of continuously introducing a stream of a conjugated diene or a stream of a vinyl-substituted aromatic compound, a stream of organolithium initiator, and at least one diluent stream into a prereaction zone wherein the polymerization is initiated, passing the effluent into a reaction zone and introducing thereinto a stream of a vinyl-substituted aromatic compound or a stream of conjugated diene (whichever was not introduced into said prereaction zone), and recovering from the effluent from said latter zone a block copolymer of said conjugated diene and said vinyl-substituted aromatic compound.

In one embodiment the present invention provides a block copolymer produced in accordance with the process of the preceding paragraph and containing at least 80 weight percent of the vinyl-substituted aromatic compound (e.g., styrene) as block vinyl-substituted aromatic compound (e.g., styrene).

In another embodiment, the present invention provides a novel polymerization system which comprises a prereactor provided with a stirring means, means for introducing a monomer, an initiator and a diluent into said prereactor, conduit means connecting the prereactor to another reactor also provided with stirring means, means for introducing a second monomer into said another reactor, and a conduit means for withdrawing reaction mixture from said last-mentioned reactor. In the practice of the present invention, it has been found to be necessary to employ the combination of a prereactor and a second reactor in order to obtain the block copolymer product. Thus, if the reactant materials are merely introduced as a mixture into a single stirred reactor in a continuous manner, the product obtained is a random copolymer rather than a block copolymer.

Conjugated dienes which are used in preparing the block copolymers of this invention are 1,3-butadiene, 2-methyl-1,3-butadiene (isoprene), and 1,3-pentadiene (piperylene). The vinyl-substituted aromatic hydrocarbons which are employed in the practice of the invention can be any vinyl-substituted aromatic hydrocarbon in which the vinyl group is attached to a nuclear carbon atom. It is to be understood that a compound having a constituent on the alpha carbon atom, such as alpha-methyl styrene, is not applicable to the practice of the present invention. Vinyl-substituted aromatic hydrocarbons which can be advantageously utilized include styrene, 1-vinylnaphthalene, 2-vinylnaphthalene, 3-methylstyrene, and alkyl, cycloalkyl, aryl, aralkyl, and arylalkyl derivatives thereof in which the total number of carbon atoms in the combined substituents is generally not greater than 12. Examples of these aromatic hydrocarbons include, among others, the following:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene In the practice of the present invention the total amount of the vinyl-substituted aromatic hydrocarbon utilized is in the range of 10 to 50 parts by weight per 100 parts by weight of total monomers to be polymerized. Furthermore, with regard to the product obtained, at least 80 weight percent of the vinyl-substituted aromatic hydrocarbon contained in the composition should be in the homopolymer block or blocks of the block copolymer.

The initiator employed in the present invention is an organolithium compound. It is often preferred to employ a compound having the formula RLi, wherein R is a radical selected from the group consisting of alkyl, aryl, and cycloalkyl. It is to be understood that combinations of these radicals, such as arylalkyl, aralkyl, alkylcycloalkyl, and cycloalkylalkyl, can be used. The R radical in the formula preferably contains from 2 to 10, inclusive, carbon atoms. Examples of these compounds include, among others, the following: ethyllithium, isopropyllithium, n-butyllithium, tert-octyllithium, n-decyllithium, phenyllithium, naphthayllithium, 4-butylphenyllithium, 3-tolyllithium, 4-phenylbutyllithium, cyclohexyllithium, 4 - butylcyclohexyllithium, 4 - cyclohexylbutyllithium, and the like.

As disclosed in copending U.S. application Serial No. 162,636, filed on December 26, 1961 by R. P. Zelinski, a block copolymer containing three blocks can be prepared by providing an initiator system whereby a lithium atom is attached to each end of the polymer block initially formed in the polymerization. It is to be understood that such initiators can also be employed in the practice of the present invention. As disclosed in said last-mentioned Zelinski application, the initiator comprises the reaction product of lithium and a condensed ring aromatic compound. The condensed ring aromatic compound is selected from the group consisting of naphthalene, anthracene, and phenanthracene and alkyl derivatives thereof in which the total number of carbon atoms in the alkyl group or groups is preferably in the range of 1 to 6 carbon atoms. Examples of alkyl derivatives of naphthalene, anthracene and phenanthracene include, among others, the following: 1-methylnaphthalene, 2-methylnapthalene, 1-tert-butylnaphthalene, 2-amylnaphthalene, 2,4-di-n-propylnaphthalene, 9-methylanthracene, 1,4,5-triethylanthracene, 2,7-dimethylphenanthrene, and the like. In reacting these materials, at least two gram atoms of lithium per mol of the condensed ring aromatic compound is employed. It is generally preferred to employ an excess of lithium, e.g., four gram atoms, in preparing the initiator system. After the reaction is completed, the excess lithium can be removed by filtration, decantation or other suitable methods. The materials are generally reacted at a temperature below 50° F., e.g., at a temperature in the range of —40° F. to 40° F.

The reaction of the lithium and the aromatic compound is conducted in a polar solvent, and ethers are usually employed for this purpose. It is preferred to use as a solvent an aliphatic monoether having the formula ROR, wherein each R is an alkyl group containing from 2 to 12, inclusive, carbon atoms. Examples of such ethers include, among others, the following: diethyl ether, diisopropyl ether, di-n-butyl ether, di-sec-butyl ether, ethyl n-propyl ether, ethyl isobutyl ether, ethyl butyl ether, ethyl n-pentyl ether, and the like. Other polar solvents, such as thioethers and tertiary amines, e.g., diethyl sulfide and triethylamine, can also be utilized as the solvent. Examples of suitable thioethers and tertiary amines include, among others, the following: diisopropyl sulfide, ethyl isopropyl sulfide, ethyl n-propyl sulfide, isopropyldiethylamine and di-n-propylethylamine. The amount of the polar solvent employed in reacting the lithium with the condensed ring aromatic compounds is not critical and can, therefore, vary within very wide limits. There is nothing critical as regards to time during which the materials are reacted in forming the initiator system. The reaction is usually continued until all of the condensed ring aromatic compound has reacted with the lithium metal although it is not essential that such a procedure be followed. The reaction time generally falls within the range of 1 to 20 hours although shorter and longer times can be utilized.

The process of this invention is carried out in the presence of a hydrocarbon diluent selected from the group consisting of paraffinic, cycloparaffinic and aromatic hydrocarbons. The preferred hydrocarbons are those containing from 3 to 12, inclusive, carbon atoms. Examples of suitable diluents include, among others, the following: propane, isobutane, n-pentane, isooctane, n-dodecane, cyclopentane, cyclohexane, methylcyclohexane, benzene, toluene, xylene, naphthalene, and the like. It is to be understood that mixtures of two or more of these hydrocarbons can be used in the process.

The amount of the organolithium initiator compound employed in the practice of the invention can vary over a wide range. In general, at least 0.05 part by weight of the initiator compound per 100 parts by weight of the total monomers to be polymerized is employed in the process. The upper limit for the amount of the organolithium compound to be used depends primarily upon the desired inherent viscosity of the block copolymer resulting from the polymerization. The inherent viscosity of the polymer produced decreases with increasing amounts of organolithium compound. A preferred initiator level is from 0.1 to 2 parts by weight of the organolithium compound per 100 parts by weight of total monomers to be polymerized.

Various materials are known to be destructive to the initiator systems used in the present process. These materials include carbon dioxide, oxygen and water. It is very desirable, therefore, that the monomers be freed of these materials as well as other materials which may tend to inactivate the initiator. Any of the known means for removing such contaminants can be used. It is also preferred that the diluent used in the process be substantially free of impurities such as water, oxygen and the like. In this connection, any air or moisture in the system is generally removed therefrom by purging with an inert gas, such as nitrogen, prior to charging of the reactant materials.

Figure 1:
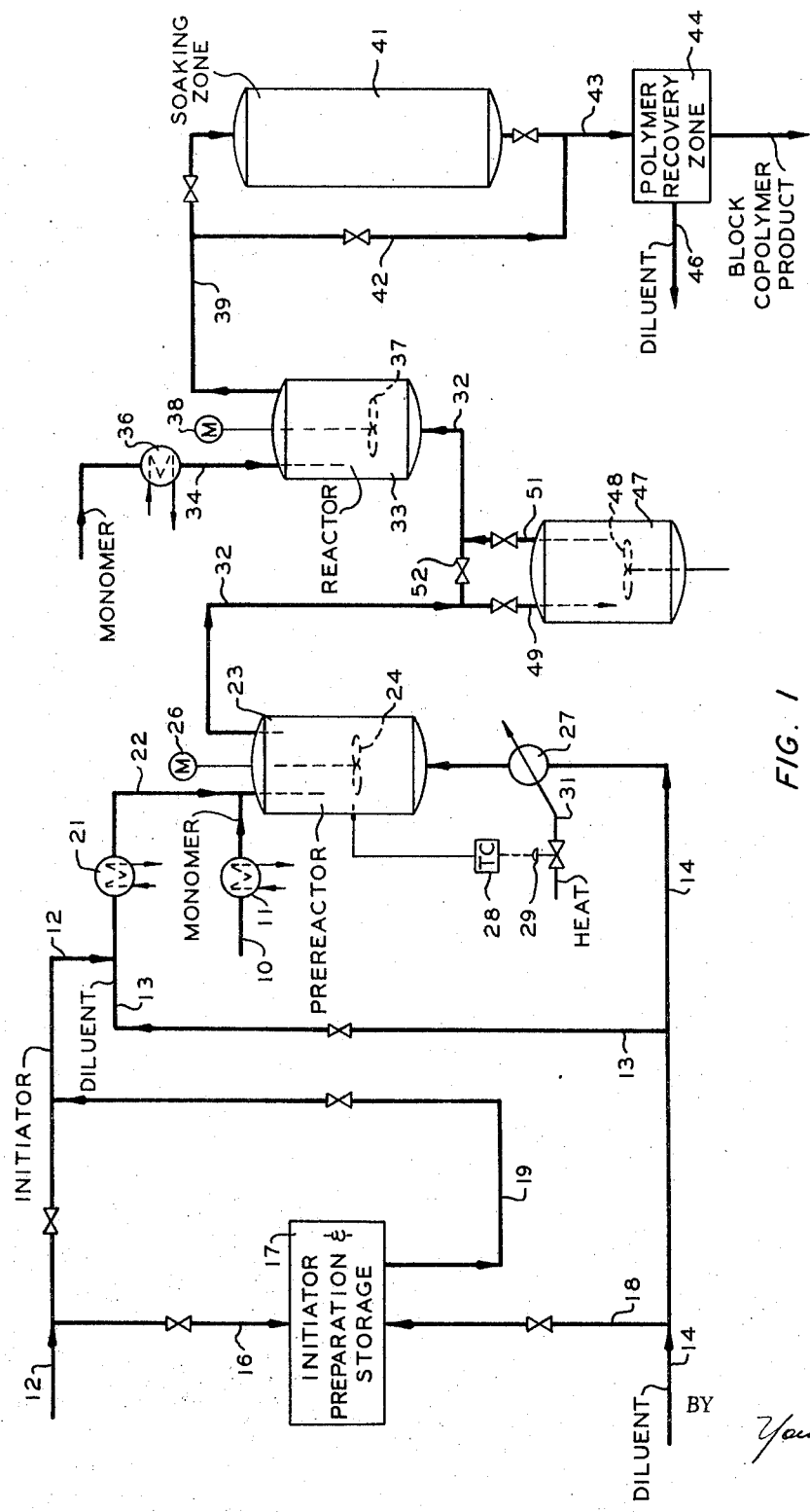
FIGURE 1 is a flow diagram illustrating presently preferred embodiments of the present invention.

Referring now to FIGURE 1, the present invention will be more fully explained. It is to be understood that said FIGURE 1 is diagrammatic in nature. Many valves, pressure gauges, pumps, etc., not necessary for explaining the invention to those skilled in the art have been omitted so as to simplify said drawing. All of the individual elements shown in said drawing are commercially available conventional equipment. The embodiment of the present invention which resides in the reactor system shown resides in combinations and arrangements of said elements to obtain the improved results as described herein. Also, while the drawing will be described with regard to particular reactant materials, it is to be understood that the invention is applicable to the use of other materials as discussed hereinbefore. One monomer, either a conjugated diene such as 1,3-butadiene or a vinyl-substituted aromatic hydrocarbon such as styrene, enters the system through conduit 10 which is provided with indirect heat exchanger 11 for controlling the temperature of said monomer stream. In the practice of the invention it is preferred that said monomer stream enter the system as a "cold" stream and therefore heat exchanger 11 will usually be employed as a cooling means. The temperature of said monomer in conduit 10 is usually maintained within the range of about 60 to 80° F., although temperatures outside this range can be employed if desired or necessary.

An organolithium initiator enters the system through conduit 12 and is introduced into conduit 13 wherein it is mixed with a portion of the hydrocarbon diluent, such as cyclohexane, which is used in the practice of the invention. Said hydrocarbon diluent initially enters the system through conduit 14. When utilizing a monolithium compound, such as n-butyllithium, said monolithium compound can be passed through conduit 16 into initiator preparation and storage zone 17 wherein it can be mixed with hydrocarbon diluent introduced into said zone 17 via conduit 18. In such instances zone 17 can merely be a vessel in which the lithium compound and diluent are mixed and stored. When zone 17 is so used, initiator mixture is withdrawn therefrom via conduit 19 and passed via conduit 12 as shown into conduit 13. When this latter method of preparing the initiator composition is employed, additional diluent is usually not introduced via conduit 13. As shown, said conduit 13 is also provided with an indirect heat exchange means 21 which is employed to control the temperature of the mixture in said conduit 13. In the practice of the invention said heat exchanger 21 is normally employed as a cooling means to maintain the temperature of the mixture in conduit 13 within the range of about 60 to about 80° F. However, as discussed hereinbefore, it is within the scope of the invention to utilize as the initiator composition the reaction product of lithium and a condensed ring aromatic compound. When employing this latter initiator system, said zone 17 can comprise a reaction vessel in which the lithium and the condensed ring aromatic compound are reacted and, when required, a means for removing excess ether, such as a distillation means.

The diluent and initiator mixture in conduit 13 and the monomer in conduit 10 are each introduced into conduit 22 wherein they are mixed and passed into prereactor 23. It will be noted that said conduit 10 is connected into said conduit 22 at a point close to said prereactor 23 and discharged into prereactor 23 via conduit 22 at a high velocity, e.g., 5 to 20 ft./sec., to minimize polymerization of the monomer prior to its entry into prereactor 23. Although conduits 10, 12, and 13 have been shown as connected to conduit 22 which in turn is connected to prereactor 23, it is within the scope of the invention to connect any of said conduits 10, 12, and 13 to said prereactor 23 individually. However, the preferred connections are as shown. Said prereactor is provided with a suitable stirring means, which can comprise an impeller 24 driven by a motor 26, which operates to provide good contact between the materials charged.

The remainder of the hydrocarbon diluent utilized in the practice of the invention is charged to prereactor 23 through conduit 14. Said conduit 14 is also provided with an indirect heat exchanger 27 which is employed for heating said diluent. The temperature of the diluent stream introduced into prereactor 23 through conduit 14 is thus employed to control the temperature within said prereactor at the desired polymerization temperature. If desired, the temperature within prereactor 23 can be controlled by means of temperature controller 28 which is operatively connected to valve 29 in conduit 31 to control the amount of heating medium, such as steam, supplied to heat exchanger 27. The ratio of the "hot" diluent in conduit 14 to the "cold" diluent, introduced into the system with the initiator through either conduits 13 or 19, will usually be within the range of from 4:1 to 10:1. The over-all ratio of total diluent charged to the system to total monomers charged to the system will usually be within the range of from 10:1 to 20:1.

The temperature employed in prereactor 23 can vary over a rather wide range, e.g., from 220 to 350° F. It is usually preferred to operate at a temperature in the range of 220 to 250° F. The pressure maintained in prereactor 23 is sufficient to maintain the materials therein substantially completely in the liquid phase. It has been found to be preferable to introduce the initiator and the monomer from conduit 22 into the liquid phase at a point below the point of withdrawal of reaction mixture and in close proximity to impeller 24 so as to obtain good mixing and minimize withdrawal of unreacted monomer with the reaction mixture, as discussed further hereinafter. Said prereactor can be operated liquid full or with a gas cap over the liquid therein.

The residence time of the materials in prereactor 23 is usually in the range of 1 to 30 minutes. It is preferred to employ a residence time of 4 to 15 minutes. The amount of the monomer converted to polymer in prereactor 23 is generally in the range of 60 to 95 weight percent, more generally 85 to 95 percent, still more generally 90–95 percent.

After the desired residence time, the reaction mixture formed in prereactor 23 is withdrawn through conduit 32 and passed into reactor 33. Another monomer, either a conjugated diene or a vinyl-substituted aromatic hydrocarbon (whichever was not introduced into prereactor 23) is introduced into said reactor 33 via conduit 34 which can, if desired, or necessary, be provided with heat exchanger 36 for controlling the temperature within reactor 33. Said reactor 33 can comprise a vessel, provided with a stirring means 37 driven by motor 38, and having a capacity or size dependent upon the residence time which it is desired to use in conducting the process. It is usually preferred that the residence time in reactor 33 be in the range of 1 minute to 20 minutes. The polymerization continues in reactor 33 until the desired conversion is obtained. Generally, the process is conducted so that the conversion of monomers to polymer is substantially completed in reactor 33. The reaction mixture containing block copolymer, diluent and initiator, and in some instances, unreacted vinyl-substituted aromatic hydrocarbon, is withdrawn from reactor 33 through conduit 39 and then passed into soaking zone 41. The soaking zone can be a separate vessel as shown in the drawing, or reactor 33 can be large enough to provide the desired reaction time to essentially complete the polymerization. In the latter instance reaction mixture in conduit 39 is passed through conduit 42 into conduit 43. In the event the reaction mixture charged to the soaking zone contains unreacted monomer, the polymerization continues in the soaking zone until essentially complete.

The temperature maintained in reactor 33 and in the soaking zone can be substantially the same as that in the prereactor. When charging a vinyl-substituted aromatic hydrocarbon monomer to reactor 33, it is usually preferred to maintain the temperature within reactor 33 and soaker 41 in the range of from 180 to 250° F. However, when charging a conjugated diene monomer to reactor 33 it is usually preferred to maintain the temperature within reactor 33 and soaker 41 within the range of from 220 to 350° F. The polymerization reaction is generally allowed to proceed as an adiabatic reaction although it is usually undesirable to employ a temperature greater than about 350° F. If the temperature in either the prereactor or reactor 33 should become excessively high, e.g., above 350° F., the temperature of polymerization can be conveniently lowered by controlling the temperature of the diluent introduced into the prereactor through conduit 14 and/or by controlling the temperature of the monomer introduced into reactor 33 via conduit 34.

The polymerization mixture in soaking zone 41 is withdrawn through conduit 43 and then passed into polymer recovery zone 44. The polymer recovery zone comprises means suitable for recovering the block copolymer product from solution in the hydrocarbon diluent, such as cyclohexane. In one method of polymer recovery, the initiator is inactivated by the addition of material, such as ethyl alcohol, isopropyl alcohol, or the like. It is usually preferred to add only an amount of initiator-deactivating material which is sufficient to deactivate the initiator without causing precipitation of the desired polymer. It has also been found to be advantageous to add an antioxidant, such as 2,2'-methylene-bis(4-methyl-6-tert-butylphenol), to the polymer solution prior to precipitation of the polymer. After addition of the initiator-deactivating agent and antioxidant, the polymer present in the solution can then be precipitated by the addition of an excess of a material, such as ethyl alcohol or isopropyl alcohol. It is to be understood, however, that the deactivation of the initiator and precipitation of the polymer, can be accomplished in a single step. The precipitated polymer can then be recovered by filtration, decantation or the like. In order to further purify the polymer, the separated polymer can be redissolved in a suitable solvent and again precipitated by addition of an alcohol. Thereafter, the polymer is again recovered by suitable separation means as indicated hereinbefore and dried. Any suitable hydrocarbon diluent, such as those mentioned hereinbefore, can be used in this purification step to redissolve the polymer. The diluent and alcohol can in all cases be separated, for example, by fractional distillation and reused in the process. In another method of polymer recovery, the polymer solution recovered from soaking zone 41 is passed to a steam stripping zone wherein the diluent is removed from the solution in a steam stripping operation. The diluent which is recovered from zone 44 through conduit 46 can, after suitable treatment, be recycled to the prereactor. A block copolymer product recovered from zone 44 can be further dried, as required, and then sent to storage facilities.

In another embodiment of the invention a second prereactor 47 is employed in series with prereactor 23 to complete the polymerization of the monomer introduced into prereactor 23. Due to the continuous introduction of fresh monomer into prereactor 23 there will always be a small amount of unpolymerized monomer which will carry out of said prereactor and pass with the effluent into reactor 33 unpolymerized. As discussed hereinafter, this monomer will be polymerized immediately in said reactor 33 but will do so in the presence of the other monomer which is introduced into reactor 33 through conduit 34. This will result in the formation of a block of copolymer which is composed substantially of the monomer introduced into reactor 33 but containing a few units of the other monomer introduced into prereactor 23.

When it is desired to obtain a homopolymer block of the first monomer introduced into prereactor 23 and a homopolymer block of the second monomer introduced into reactor 33, a second prereactor zone 47 is provided in series with prereactor zone 23 to complete the polymerization of said first monomer. Thus, in another embodiment of the invention a second prereactor 47 equipped with stirring means 48 is provided and the reaction mixture in conduit 32 is passed into said second prereactor 47 via conduit 49. Reaction mixture from said second prereactor 47 is passed via conduit 51 back into conduit 32 on the other side of the valve 52 and then passed into reactor 33. The temperature within prereactor 47 is substantially the same as that in prereactor 23. The residence time in prereactor 47 is sufficient to obtain essentially 100 percent conversion of said first monomer and is usually within the range of 1 to 10 minutes.

When utilizing the RLi compounds described above as initiators in the practice of the invention, there is obtained a block copolymer product which is composed of two polymer blocks, i.e., a block which is a homopolymer block of the monomer charged to the prereactor and another block which is either a homopolymer or essentially a homopolymer of the other monomer which is charged to the succeeding reactor 33. In the preparation of a block copolymer containing two polymer blocks using said RLi initiator, a lithium atom attaches itself to one end of the homopolymer molecules of the monomer introduced into the prereactor and the other monomer introduced into reactor 33 polymerizes onto the end of said molecules having the attached lithium atoms.

For example, when utilizing the embodiment of the invention wherein only one prereactor 23 is employed and a monomer, such as butadiene, is charged thereto, there is first obtained a polymer block which is homopolymer of butadiene. Thus, at conversion levels of 90 to 95 percent in prereactor 23, only 5 to 10 percent of the butadiene remains unpolymerized. The 90 to 95 percent of butadiene which does polymerize forms a homopolymer. The remaining 5 to 10 percent of butadiene polymerizes in reactor 33 in the presence of the other monomer, such as styrene, and there is obtained a polymer block which is a copolymer containing only a few units of butadiene. Since the number of units of butadiene in said copolymer block is so small compared to the number of styrene units, said copolymer block can be considered a homopolymer of styrene for all practical purposes. When utilizing the embodiment of the invention where two prereactors 23 and 47 are employed, all of the first monomer, such as butadiene, introduced into prereactor 23 is polymerized in prereactors 23 and 47, and the polymer block formed in reactor 33 is a true homopolymer of the other monomer, such as styrene.

When utilizing an initiator comprising the reaction product of lithium and a condensed ring aromatic compound, there is obtained a block copolymer product composed of three polymer blocks, i.e., a central block which is a homopolymer of the monomer, such as butadiene, charged to prereactor 23 and two end or terminal blocks which are either homopolymers or essentially homopolymers of the other monomer, such as styrene, which is charged to reactor 33. In preparing such a block copolymer product using said initiator, a lithium atom is attached to each end of the molecules of the polymer block initially formed in said prerecator and the other monomer polymerizes onto each end of the molecules of said initial polymer to form the two end or terminal blocks. For example, when using the embodiment of the invention wherein only one prereactor 23 is employed and a monomer, such as butadiene, is charged thereto, there is first obtained a polymer block which is a homopolymer of butadiene. As before, at conversion levels of 90 to 95 percent, the remaining 5 to 10 percent of the butadiene polymerizes in reactor 33 in the presence of the other monomer, such as styrene, but since the molecules of the homopolymer block of butadiene formed in prereactor 23 have a lithium atom on each end, there is obtained on each end of said homopolymer block a copolymer block containing only a few units of butadiene. Since the number of butadiene units in these copolymer blocks is so small compared to the number of styrene units, said copolymer blocks can be considered as homopolymer blocks of styrene for all practical purposes. When utilizing the embodiment of the invention where two prereactors such as 23 and 47 are employed, all of the monomer introduced into prereactor 23 is polymerized in prereactors 23 and 47 and the homopolymer blocks formed in reactor 33 are true homopolymers of the monomer introduced into reactor 33, such as styrene.

The following examples will serve to further illustrate the invention.

EXAMPLE I

A run was carried out according to the present invention in which 1,3-butadiene and styrene were polymerized with n-butyllithium. The reactor system employed in this run was substantially the same as that illustrated in FIGURE 1 and only one prereactor 23 was employed, the valve 52 in conduit 32 being open and the valves in conduits 49 and 51 being closed. Said prereactor 23 was a one-half gallon vessel provided with a stirring means. The initiator, monomer and diluent feed lines were connected to the prereactor essentially as shown in said FIGURE 1. The reactor 33 was a vessel having a capacity of 0.2 gallon. The soaker section 41 was a vessel having a capacity of 1.1 gallons.

In this run butadiene, initiator, and diluent were continuously charged into the top of prereactor 23 essentially as shown. Said initiator was passed through conduit 12 as a 0.24 weight percent solution of butyllithium in n-hexane. Said butadiene monomer, initiator and diluent introduced into the top of the prereactor were at room temperature, about 75° F. The diluent n-hexane introduced into the bottom of said prereactor was heated to a temperature of approximately 270° F. Styrene monomer was continuously introduced at room temperature via conduit 34 into reactor 33. The conditions of operation and flow rates are set forth below in Table I.

*Table I*

Operating conditions:
 Initiator, lbs./min. _____ 0.013
 Cold diluent, lbs./min. _____ 0.08
 Hot diluent, lbs./min. _____ 0.40
 Butadiene rate, lbs./min. _____ 0.025
 Styrene rate, lbs./min. _____ 0.008
 Solvent:Monomers ratio _____ 15:1
 Prereactor (vessel 23):
  Capacity, gals. _____ 0.5
  Temperature, ° F. _____ 240
  Residence time, min. _____ 5.4
 Reactor (vessel 33):
  Capacity, gals. _____ 0.2
  Temperature, ° F. _____ 200
  Residence time, min. _____ 2.2
 Soaker (vessel 41):
  Capacity, gals. _____ 1.1
  Temperature, ° F. _____ 215
  Residence time, min. _____ 23
Block copolymer product:
 Total styrene content, wt. percent _____ 30
 Block styrene content, wt. percent _____ 27
 Inherent viscosity _____ 1.3
 Mooney value (ML–4) _____ 86

The block copolymer product obtained in this run contained 30 weight percent of total bound styrene, and the essentially homopolymer block of styrene contained 27 weight percent styrene (block styrene). The run was continued for a period of 7 hours during which there was no gel formation in the reactor system.

In this and succeeding examples, the amount of styrene contained in the homopolymer block was determined by an oxidative degradation procedure. The oxidation method is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular segments such as polystyrene or the polystyrene units in block copolymers containing no ethylenic bonds remain unattacked. The small fragments, (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of a high molecular weight polystyrene which constitutes the homopolymer blocks of the block copolymer.

Approximately 0.5 gram of the polymer prepared as described was cut into small pieces, weighed within 1 milligram and charged to a 125 milliliter flask. Forty to fifty grams of p-dichlorobenzene was then charged to the flask and the flask was heated to 130° C. The flask was maintained at this temperature until the polymer present had become dissolved. The solution was then cooled from 80 to 90° C., and 8.4 ml. of a 71.3 percent by weight aqueous solution of tert-butyl hydroperoxide was added. One milliliter of 0.003 molar osmium tetraoxide in toluene was the charged to the flask contents, and the resulting solution was heated to between 110 and 115° C. for 10 minutes. The solution was then cooled to between 50 to 60° C., afterwards 20 ml. of toluene were added, and the solution was poured slowly into 250 ml. of ethanol containing a few drops of concentrated sulfuric acid. Polystyrene coagulated out of solution, and this polymer was recovered and dried. The weight percent of polystyrene recovered is the measure of the amount of styrene contained in the homoploymer block.

EXAMPLE II

Figure 2:
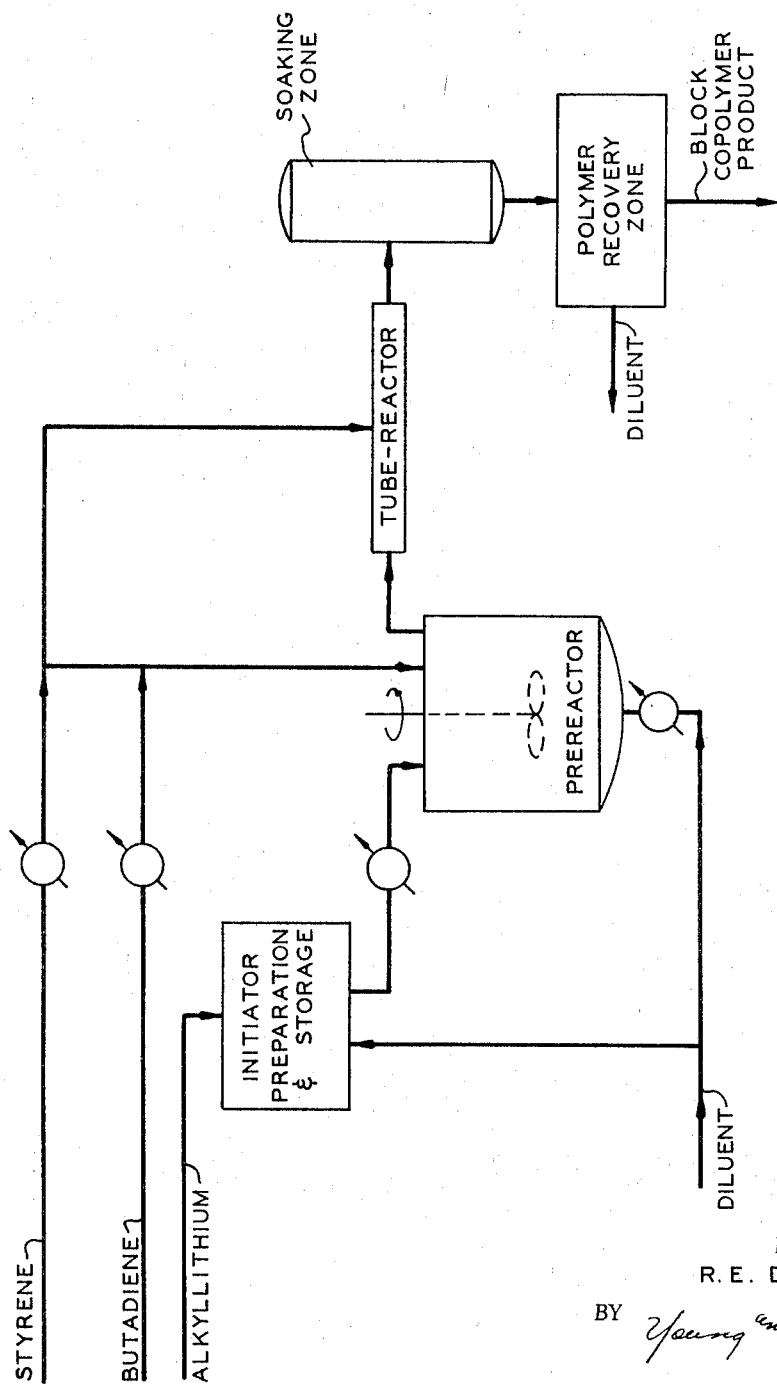
FIGURE 2 is a flow diagram illustrating a preferred embodiment of the invention of said copending application Serial No. 186,178, filed April 9, 1962, and will be discussed further hereinafter in connection with Examples II and III.

A control run was carried out according to the invention of said copending application Serial No. 186,178 in which a mixture of 1,3-butadiene and styrene was polymerized with n-butyllithium. The reactor system employed in this run was substantially the same as that shown in FIGURE 2. The prereactor was a one-half gallon vessel provided with a stirring means. The initiator, monomer, and diluent feed lines were connected to the prereactor as shown in the drawing. The tube reactor consisted of 150 feet of ⅜" copper tubing and the soaking zone consistd of three sections of 2" pipe, each section being two feet long. The soaking section was connected directly into the downstream end of the copper tubing.

A mixture of butadiene and styrene was continuously charged into the top of the stirred reactor. A 0.66 weight percent solution of butyllithium in n-hexane was also charged into the top of the prereactor at a point 180° removed from the point of introduction of the monomer mixture. The diluent n-hexane was heated and introduced into the bottom of the prereactor. The conditions of operation and the flow rates are set forth hereinbelow in Table II.

*Table II*

| | |
|---|---|
| Initiator[1] lbs./min. | 0.018 |
| Mixture of monomer[2] lbs./min. | 0.05 |
| Total diluent, lbs./min. | 0.75 |
| Temperature, °/F. | 210 |

[1] Charged as a 0.66 weight percent solution of butyllithium in n-hexane.
[2] 25 parts by weight of styrene and 75 parts by weight of butadiene.

The block copolymer product obtained in this run contained 25 weight percent bound styrene, and the homopolymer block contained 11 weight percent styrene. The run was continued for a period of eight and one-half hours, and there was only a slight formation of gel in the reactor system.

EXAMPLE III

Another run was conducted in which a monomer mixture containing 75 weight percent 1,3-butadiene and 25 weight percent styrene was polymerized with n-butyllithium in the presence of n-hexane. In this run, the prereactor had a capacity of 750 ml. and was provided with a stirring means. The prereactor was connected to a tube reactor consisting of 300 feet of ⅜" copper tubing. A soaking zone consisting of three 2' sections of 2" pipe was connected to the downstream end of the copper tubing. The flow rates employed in this run, which was carried out essentially the same as Example II, are set forth below in Table III.

*Table III*

| | |
|---|---|
| Initiator[1] lbs./min. | 0.024 |
| Monomer mixture[2] lbs./min. | 0.09 |
| Total diluent, lbs./min. | 0.60 |
| Temperature, °/F. | 210 |

[1] Charged as a 0.35 weight percent solution of butyllithium in n-hexane.
[2] 25 parts by weight of styrene and 75 parts by weight of butadiene.

The run was continued for a period of 4 hours, and no fouling of the reaction system occurred during the run. The block copolymer produced contained 25.6 weight percent bound styrene and 16.4 weight percent of styrene was contained in a homopolymer block. The block copolymer product had a Mooney value (ML-4) of 74.

The block copolymers produced in accordance with this invention have utility in general applications where natural and synthetic rubbers are used. For example, they can be employed in the manufacture of automobile tires, gaskets, and other rubbery articles. The block copolymers can also be advantageously utilized as adhesives. They are particularly useful in performing extruded articles, such as coated wire, because of their high extrudability with very little or no die swell. The block copolymers are also thermoplastic and show no shrinkage when molded. These properties render the block copolymers suitable for use in preparing molded articles. Block copolymers of this invention are further characterized by their very high green tensile strengths.

The block copolymers can be compounded by any of the known methods such as have been used in the past for compounding natural and synthetic rubbers. Vulcanization accelerators, reinforcing agents, and fillers, such as have been employed in synthetic and natural rubbers, can likewise be used in compounding the block copolymers.

As will be evident to those skilled in the art, many variations and modifications of the invention can be practiced in view of the foregoing disclosure. Such variations and modifications are believed to be clearly within the spirit and scope of the present invention.

I claim:

1. A continuous process for preparing a block copolymer of a conjugated diene and a vinyl-substituted aromatic hydrocarbon, which process comprises, in combination, the steps of: continuously charging to a prereaction zone the following materials (1) a first monomer selected from the group consisting of 1,3-butadiene, isoprene, and piperlylene, and the monovinyl-substituted aromatic hydrocarbons, (2) an organolithium polymerization initiator, (3) a first stream of a hydrocarbon diluent selected from the group consisting of paraffinic, cycloparaffinic, and aromatic hydrocarbons, said materials (1), (2), and (3) being introduced at relatively cold temperature, and (4) a second stream of said hydrocarbon diluent at a relatively hot temperature greater than the temperature of said materials (1), (2) and (3), maintaining the contents of said prereaction zone under turbulent mixing conditions and under sufficient pressure to maintain said contents substantially completely in the liquid phase, and maintaining the temperature in said prereaction zone within the range of from 220 to 350° F. when said first monomer is one of said diene compounds and within the range of from 180 to 250° F. when said first monomer is one of said aromatic compounds by controlling the temperature of said second stream of hydrocarbon diluent; continuously withdrawing from said prereaction zone an effluent containing initiator, polymer, and diluent; continuously passing said effluent into a reaction zone; continuously introducing into said reaction zone a stream of a second monomer selected from the above group of monomers but which is a dissimilar type of compound from said first monomer; maintaining the contents of said reaction zone under turbulent mixing conditions and under sufficient pressure to maintain said contents substantially completely in the liquid phase; and maintaining the temperature in said reaction zone within the range of from 180 to 250° F. when said second monomer is one of said aromatic compounds and within the range of from 220 to 350° F. when said second monomer is one of said diene compounds by controlling the temperature of said stream of second monomer; and continuously recovering from said reaction zone a reaction mixture containing said block copolymer; the total amount of said aromatic compound monomer used in said process being within the range of from 10 to 50 parts by weight per 100 parts by weight of total monomers to be polymerized.

2. A process according to claim 1 wherein the residence time within said prereaction zone is within the range of from 1 to 30 minutes and the residence time in said reaction zone is within the range of from 1 to 20 minutes.

3. A process according to claim 1 wherein said effluent withdrawn from said prereaction zone is passed to a second prereaction zone wherein the temperature is substantially the same as in said first mentioned prereaction zone, the residence time in said second prereaction zone is within the range of from 1 to 10 minutes, and an effluent containing initiator, polymer, and diluent is continuously withdrawn from said second prereaction zone and passed to said reaction zone.

4. A process according to claim 1 in which said first monomer is 1,3-butadiene and said second monomer is styrene.

5. A process according to claim 1 wherein said first monomer is styrene and said second monomer is 1,3-butadiene.

6. A process according to claim 1 in which said initiator is n-butyllithium.

7. A process according to claim 1 in which said initiator is the reaction product obtained by reacting lithium with a condensed ring aromatic compound.

8. A process according to claim 1 wherein: said effluent withdrawn from said reaction zone is continuously passed to a soaker zone to essentially complete the polymerization reaction; an effluent containing polymer, initiator, and diluent is continuously withdrawn from said soaker zone; and said block copolymer product is continuously recovered from said soaker zone effluent.

9. A process according to claim 1 wherein: said first monomer is 1,3-butadiene; said second monomer is styrene; and said initiator is n-butyllithium.

10. A process according to claim 1 wherein: said first monomer is styrene; said second monomer is 1,3-butadiene; and said initiator is n-butyllithium.

References Cited by the Examiner

UNITED STATES PATENTS

| | | | |
|---|---|---|---|
| 2,986,551 | 5/1961 | Griffin et al. | 260—95 |
| 3,007,903 | 11/1961 | Stark | 260—95 |
| 3,074,924 | 1/1963 | Kizer et al. | 260—95 |
| 3,149,182 | 9/1964 | Porter | 260—880 XR |

FOREIGN PATENTS

| | | |
|---|---|---|
| 235,262 | 7/1961 | Australia. |
| 608,921 | 9/1960 | Italy. |

MURRAY TILLMAN, *Primary Examiner.*

SAMUEL H. BLECH, *Examiner.*

G. F. LESMES, *Assistant Examiner.*